United States Patent [19]
Edwards et al.

[11] Patent Number: 5,925,951
[45] Date of Patent: Jul. 20, 1999

[54] ELECTROMAGNETIC SHIELD FOR AN ELECTRIC MOTOR

[75] Inventors: Stanley W. Edwards, Arvada; Clifford R. Shoemaker, Westminster, both of Colo.

[73] Assignee: Sundstrand Fluid Handling Corporation, Arvada, Colo.

[21] Appl. No.: 09/100,561

[22] Filed: Jun. 19, 1998

[51] Int. Cl.$^6$ .................................................. H02K 11/00
[52] U.S. Cl. ..................... 310/68 R; 310/67 R; 310/261; 310/68 B; 324/207.12
[58] Field of Search ............................. 310/68 R, 68 B, 310/219, 223, 225, 226, 67 R, 90, 261, 264, 273; 74/DIG. 7; 384/624; 324/207.12, 207.16, 207.15

[56] References Cited

U.S. PATENT DOCUMENTS

| | | |
|---|---|---|
| 1,480,848 | 1/1924 | Walsch . |
| 2,939,074 | 5/1960 | Perrett ........................................ 324/51 |

(List continued on next page.)

FOREIGN PATENT DOCUMENTS

| | | |
|---|---|---|
| 0 169 633 | 1/1986 | European Pat. Off. . |
| 0 443 514 A2 | 8/1991 | European Pat. Off. . |
| 0 506 898 | 12/1994 | European Pat. Off. . |
| 0672886 A2 | 9/1995 | European Pat. Off. .......... G01B 7/00 |
| 0 759 544 A1 | 2/1997 | European Pat. Off. .......... G01K 1/02 |
| 0 759 545 A1 | 2/1997 | European Pat. Off. .......... G01K 1/02 |
| 0 828 152 A2 | 3/1998 | European Pat. Off. . |
| 2 163 183 | 7/1973 | France . |
| 29 30 972 | 2/1981 | Germany . |
| 42 15 381 | 11/1993 | Germany . |
| 44 41 828 A1 | 11/1994 | Germany ..................... G01M 13/04 |
| 173151 | 8/1986 | Japan . |
| 4-42016 | 6/1990 | Japan . |
| 5-30716 | 2/1993 | Japan ......................................... 17/30 |
| 08236483 | 3/1998 | Japan . |
| 1 480 848 | 7/1977 | United Kingdom ........................ 13/4 |
| 2 105 475 | 3/1983 | United Kingdom . |
| 2221306 | 1/1990 | United Kingdom . |
| 2 260 821 | 4/1993 | United Kingdom . |
| 89/12528 | 12/1989 | WIPO . |
| 98/25123 | 6/1998 | WIPO . |

OTHER PUBLICATIONS

Product Brochure "When Safety and Product Integrity Cannot be Compromised", HMD Seal/Less Pumps, HMD Seal/Less Pumps, Ltd. 1996.

Product Brochure "Protect your Pumps from Dry Running" created in Jul. 1996 for Ansimage, Inc. of Elk Grove Village, Illinois.

DRY-KUT Instruction Manual for "Monitors to Protect Your Pumps from Dry-Running and Overloading" created in 1996 for Ansimage, Inc. of Elk Grove Village, Illinois.

Sundstrand Fluid Handling Brochure entitled: "Sundyne Vertical Integrated Pump", Bulletin 11.1, dated Feb. 1992.

Sundstrand Fluid Handling Brochure entitled: "Sundyne Canned Motor Pumps", Bulletin 1.4, dated Aug. 1995.

Drawing labeled "Figure 1–3 NC Series Chempumps" (date unknown).

1 Page (No. 163) from Oct. 1992 *Chemical Engineering* Magazine advertising Teikoku Canned Motor Pump.

1 Article from Crane Co., Chempump Division, Warrington, PA entitled "Intellisense Diagnostic Monitoring System".

1 Article from Apr. 25, 1994 issue of *Design News* entitled "Switch Senses All Metals at Equal Distances".

"Equipment News" Section, Canned Motor Pumps Approved for Explosion-Proof Duty, World Pumps, Oct. 1996, p. 12.

(List continued on next page.)

*Primary Examiner*—Thomas M. Dougherty
*Assistant Examiner*—B Mullins
*Attorney, Agent, or Firm*—Marshall, O'Toole, Gerstein, Murray & Borun

[57] ABSTRACT

Electromagnetic shielding apparatus is provided for a motor having a rotor and a stator wherein the shielding apparatus is characterized by the absence of an electromagnetic shield in the stator of the motor.

18 Claims, 4 Drawing Sheets

U.S. PATENT DOCUMENTS

| | | | |
|---|---|---|---|
| 2,949,576 | 8/1960 | Bolton | 323/75 |
| 3,079,548 | 2/1963 | Robinson | 323/109 |
| 3,100,989 | 8/1963 | Jones | 73/140 |
| 3,109,095 | 10/1963 | VanHorne | 250/83.3 |
| 3,170,112 | 2/1965 | Bungardt et al. | 324/34 |
| 3,307,164 | 2/1967 | Zimmer | 340/195 |
| 3,373,300 | 3/1968 | Sullivan | 310/68 |
| 3,381,216 | 4/1968 | Sibley, Jr. et al. | 324/34 |
| 3,541,394 | 11/1970 | Brenneman et al. | 317/99 |
| 3,613,000 | 10/1971 | Weir et al. | 324/174 |
| 3,721,842 | 3/1973 | Stevenson et al. | 310/13 |
| 3,745,509 | 7/1973 | Woodward et al. | 339/14 R |
| 3,891,918 | 6/1975 | Ellis | 324/34 D |
| 3,981,621 | 9/1976 | Considine | 417/44 |
| 3,988,624 | 10/1976 | Urban | 310/168 |
| 3,991,701 | 11/1976 | Sato | 116/114 Q |
| 4,018,082 | 4/1977 | Manoliu et al. | 73/67.5 R |
| 4,059,794 | 11/1977 | Furness et al. | 324/208 |
| 4,114,960 | 9/1978 | Habermann et al. | 308/10 |
| 4,128,147 | 12/1978 | Lafuent Ruberte | 188/164 |
| 4,157,612 | 6/1979 | Rainal | 29/628 |
| 4,182,168 | 1/1980 | Desch | 73/140 |
| 4,196,613 | 4/1980 | Cole | 73/32 R |
| 4,199,718 | 4/1980 | Ikeda et al. | 324/158 MG |
| 4,211,973 | 7/1980 | Sato et al. | 324/158 MG |
| 4,334,189 | 6/1982 | Sato | 324/158 MG |
| 4,379,291 | 4/1983 | Hubbard et al. | 340/682 |
| 4,380,875 | 4/1983 | Erickson et al. | 33/203.13 |
| 4,387,596 | 6/1983 | Fenkner et al. | 73/593 |
| 4,401,946 | 8/1983 | Klimstra | 324/208 |
| 4,406,999 | 9/1983 | Ward | 340/870.31 |
| 4,423,635 | 1/1984 | Senicourt et al. | 73/593 |
| 4,473,259 | 9/1984 | Goldowsky | 308/10 |
| 4,493,042 | 1/1985 | Shima et al. | 364/507 |
| 4,563,643 | 1/1986 | Leschek et al. | 324/207 |
| 4,584,865 | 4/1986 | Hutchins | 73/7 |
| 4,638,197 | 1/1987 | Kalagidis | 310/67 R |
| 4,639,054 | 1/1987 | Kersbergen | 339/14 R |
| 4,717,874 | 1/1988 | Ichikawa et al. | 324/208 |
| 4,743,786 | 5/1988 | Ichikawa et al. | 310/111 |
| 4,748,850 | 6/1988 | Kataoka | 73/660 |
| 4,764,767 | 8/1988 | Ichikawa et al. | 340/870.31 |
| 4,775,947 | 10/1988 | Marron | 364/550 |
| 4,833,405 | 5/1989 | Richards et al. | 324/208 |
| 4,849,666 | 7/1989 | Hoag | 310/90.5 |
| 4,851,772 | 7/1989 | Acht et al. | 324/208 |
| 4,875,785 | 10/1989 | Santos et al. | 384/448 |
| 4,906,924 | 3/1990 | Zannis | 324/207.18 |
| 4,924,180 | 5/1990 | Nasr et al. | 324/207.15 |
| 4,924,674 | 5/1990 | Hara et al. | 60/608 |
| 4,931,728 | 6/1990 | Hata et al. | 324/207.15 |
| 4,952,874 | 8/1990 | Stadtfeld | 324/207.22 |
| 4,991,301 | 2/1991 | Hore | 33/366 |
| 4,992,733 | 2/1991 | Griebeler | 324/207.21 |
| 4,995,259 | 2/1991 | Khuri-Yakub et al. | 73/593 |
| 5,006,797 | 4/1991 | Smith | 324/173 |
| 5,027,819 | 7/1991 | Crum | 128/653 R |
| 5,036,236 | 7/1991 | Wilson | 310/90.5 |
| 5,072,181 | 12/1991 | Burger | 324/207.25 |
| 5,072,611 | 12/1991 | Budd et al. | 73/118.1 |
| 5,083,084 | 1/1992 | Bauer et al. | 324/207.19 |
| 5,140,849 | 8/1992 | Fujita et al. | 73/118.1 |
| 5,140,858 | 8/1992 | Nishimoto et al. | 73/587 |
| 5,198,763 | 3/1993 | Konishi | 324/207.23 |
| 5,214,378 | 5/1993 | Hore | 324/207.23 |
| 5,245,160 | 9/1993 | Quabeck et al. | 219/471 |
| 5,248,940 | 9/1993 | Patience et al. | 324/207.15 |
| 5,277,543 | 1/1994 | Noguchi et al. | 415/118 |
| 5,300,841 | 4/1994 | Preston et al. | 310/90.5 |
| 5,302,894 | 4/1994 | Hrubes | 324/207.16 |
| 5,315,244 | 5/1994 | Griebeler | 324/207.21 |
| 5,319,270 | 6/1994 | Tanaka et al. | 310/67 R |
| 5,325,005 | 6/1994 | Denk | 310/68 B |
| 5,336,996 | 8/1994 | Rusnak | 324/207.2 |
| 5,350,040 | 9/1994 | Gribble | 184/105.2 |
| 5,355,041 | 10/1994 | Shirao et al. | 310/90.5 |
| 5,363,033 | 11/1994 | Suda et al. | 324/207.15 |
| 5,394,043 | 2/1995 | Hsia | 310/90 |
| 5,406,155 | 4/1995 | Persson | 310/68 B |
| 5,430,372 | 7/1995 | Hecht | 324/207.16 |
| 5,448,924 | 9/1995 | Nagai et al. | 73/865.9 |
| 5,696,444 | 12/1997 | Kipp et al. | 324/207.32 |

OTHER PUBLICATIONS

O'Connor, Leo; "Active Magnetic Bearings Give Systems a Lift"; Mechanical Engineering; Jul. 1992; pp. 52–54.

Weise, David A. & Tome, David M.; "Magnetic Bearings Attract Attention", Power Transmission Design, pp. 21–22.

Noltingk, B.E.; "Instrumentation Reference Book"; Second Edition; Butterworth Heinemann.

Herceg, Edward E.; "Handbook of Measurement and Control"; Revised Edition; Schaevitz Engineering.

NERAC Listing—Patents Related: (Inductively) Sensing Movement in Rotating Equipment used Multiple Internal Sensors, pre–'94.

Graf, Rudolf F.; "Modern Dictionary of Electronics"; Howard W. Sams & Co., Inc.; p. 193.

1 Page (vol. 35, No. 10) from Jan. 1997 *Chemical Equipment* Magazine.

ELECTROMAGNETIC SHIELD FOR AN ELECTRIC MOTOR

TECHNICAL FIELD

The present invention relates generally to electric motors, and more particularly to a shield for use in an electric motor.

BACKGROUND ART

Machines that have relatively movable parts include bearings. In those situations where there is direct contact between relatively moving parts, consideration must be given to the problem of wear. Typically, bearing materials are selected and/or a lubricant is used so that adequate service life is obtained and so that the risk of catastrophic failure is minimized. In some machines, lubrication is provided by process fluid. One example of such a machine is a sealless pump (also referred to as a canned motor/pump or magnetic drive pump) which is used to pump fluids that must be isolated from the ambient environment. In one type of canned motor/pump, a motor stage and a pump stage are disposed within a single housing and include a common rotor coupled to a pump impeller. The rotor is supported by radial journal and axial thrust bearings lubricated with process fluid. These bearings are made of a relatively soft carbon or wear resistant ceramic material. Typically, lubrication by the process fluid is marginal, and intermittent dry operation is encountered. As a result, wear occurs at the bearings between the rotor and the stator.

Bearing wear monitors are often used in the foregoing environment to detect when bearing wear has occurred to an appreciable extent. Such bearing wear monitors include a plurality of sensor assemblies, each of which includes one or more sense windings disposed in the stator and a target disposed on the rotor. Such sensor assemblies, however, are positioned within the axial extent of the stator windings of the motor, and thus are exposed to electromagnetic interference, which adversely affects the operation of the sensors. In an attempt to remedy this situation, it has been proposed to provide electromagnetic shields in the stator and rotor of the motor. The stator shield is disposed between the motor stator windings and the sense windings whereas the rotor shield is disposed between the rotor structure and the target of the sensor assembly. While this shielding apparatus may be effective to provide adequate immunity against electromagnetic interference, such a shielding configuration requires a relatively long axial length between the sensor assembly and the ends of the motor stator windings. In addition, such a shielding configuration utilizes a relatively large amount of material in manufacturing and is likely to experience vibration resulting from shaft dynamic problems.

SUMMARY OF THE INVENTION

A motor includes an electromagnetic shield which is positioned to avoid the disadvantages noted above.

More particularly, a motor includes a stator, a rotor having a rotor structure including magnetically permeable material and terminating at a first axial plane, and a sensor assembly disposed at a second axial plane spaced from the first axial plane. An electromagnetic shield is carried by the rotor and is located between the first and second axial planes. Further, the stator is characterized by the absence of an electromagnetic shield therein.

Preferably, a spacer element is carried by the rotor between the electromagnetic shield and the sensor assembly. Also preferably the spacer element is fabricated of a low permeability material, such as aluminum.

The sensor assembly may include stator and rotor portions in the second axial plane and the rotor structure may include a shorting end ring in the first axial plane. The electromagnetic shield may be placed in abutment with a shorting end ring and may further include a spacer element disposed between and in abutment with the electromagnetic shield and the rotor portion of the sensor assembly. Preferably, the stator includes motor stator windings therein terminating at a third axial plane spaced from the second axial plane and the first axial plane.

In accordance with the preferred embodiment, the electromagnetic shield comprises a disk-shaped piece of electrically conductive material. Further, the rotor structure preferably has a cylindrical outer diameter matching a cylindrical outer surface of the electromagnetic shield.

In accordance with a further aspect of the present invention, an improvement in a canned motor/pump including a stator having a stator winding, a rotor carrying a rotor structure and a sensor assembly spaced from the rotor structure comprises means carried by the rotor in abutment with the rotor structure and not disposed in the stator for electromagnetically shielding the sensor assembly from the stator winding.

Other features and advantages will become apparent from the specification and drawings of the present application, in which like reference numerals denote like structures.

BRIEF DESCRIPTIONS OF THE DRAWINGS

FIG. 1 comprises a diagrammatic view of a canned motor/pump;

FIG. 2 comprises an enlarged, fragmentary sectional view of a prior art canned motor/pump;

FIG. 3 comprises a view similar to FIG. 2 illustrating a further prior art canned motor/pump; and FIG. 4 comprises a view similar to FIG. 2 illustrating a preferred embodiment of the present invention.

DESCRIPTION OF THE PREFERRED EMBODIMENTS

Figure 1:
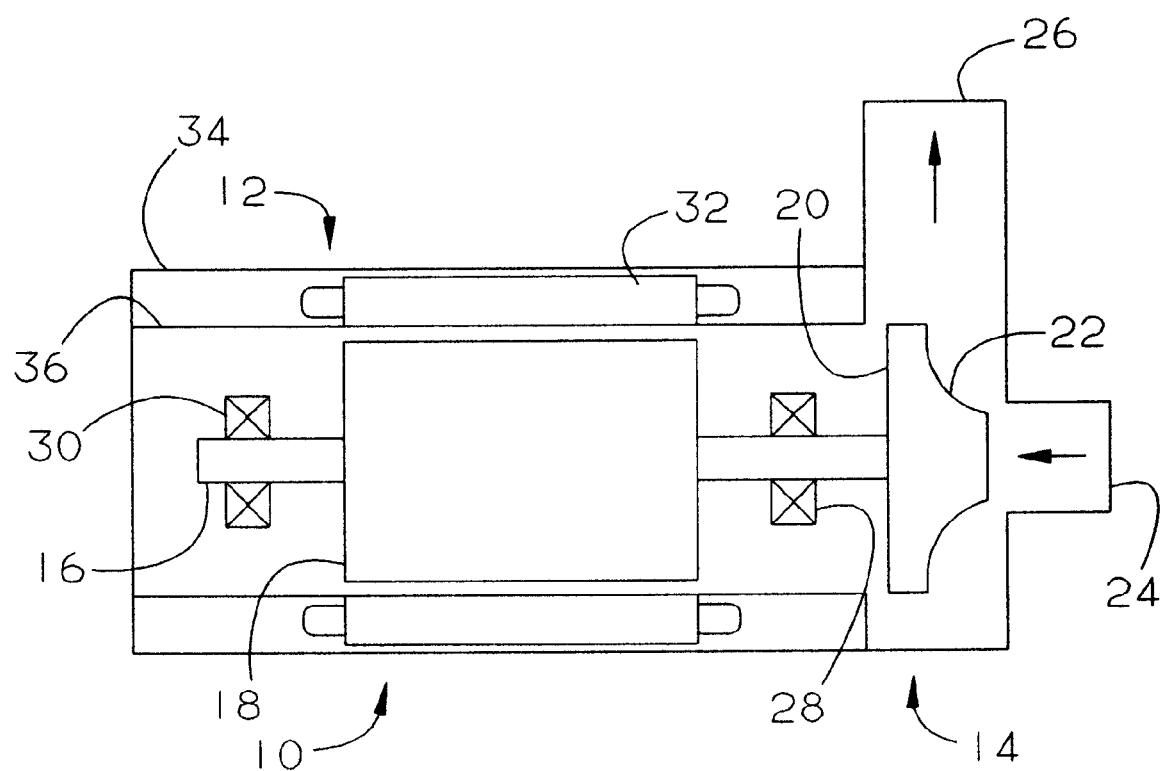

Referring now to FIG. 1, a canned motor/pump 10 includes a motor stage 12, a pump stage 14 and a rotor structure 16. In the illustrated canned motor/pump 10, the rotor structure is common to the stages 12 and 14 and includes a motor stage portion 18 and a pump stage portion 20 wherein the latter includes an impeller 22 which pressurizes a process fluid entering the canned motor/pump 10 at a pump inlet 24. The pressurized process fluid is discharged through a pump outlet 26. The rotor structure 16 is mounted for rotary motion in front and rear bearings 28, 30, respectively. Process fluid is introduced to the vicinity of the bearings 28, 30 to lubricate same. A stator structure 32 of the motor stage 12 is encased between an outer housing 34 and an inner sleeve 36 to isolate the stator structure from the process fluid.

It should be noted that the canned motor/pump 10 need not have the configuration shown in FIG. 1. For example, the canned motor/pump 10 may have completely separate motor and pump stages interconnected by a shaft. In fact, the present invention could be used in a completely different machine inasmuch as it finds utility in any environment where a sensor must be shielded from electromagnetic interference for proper operation.

Figure 2:
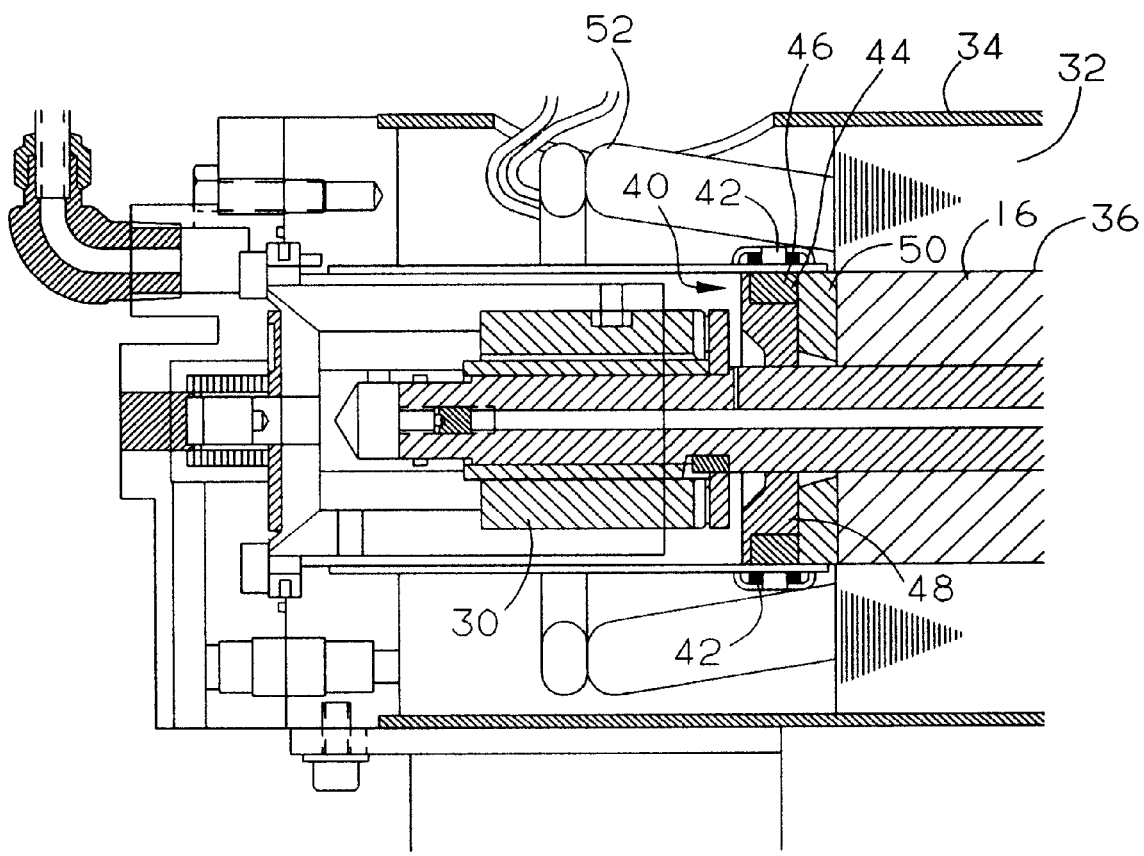

FIG. 2 illustrates a prior art device wherein a sensing assembly 40 is provided including a plurality of sense windings 42 (two of which are visible in FIG. 2) and a target 44 carried by the rotor structure 16. The target 44 includes a magnetically permeable outer ring 46 carried by a central core 48. The rotor portion of the sensor assembly 40 is disposed adjacent an end turn shorting ring 50 which is fabricated of any suitable electrically conductive material. As can be seen in FIG. 2, the sense windings 42 are located in an axial plane within the axial extent of motor stator windings 52.

In operation, as the rotor structure 16 rotates, signals are produced in the sense windings 42. If the bearing 30 has no appreciable wear, the signals induced in the sense windings all have a substantially equal magnitude. However, when wear occurs, the rotor structure 16 can move axially and/or radially, thereby causing the signal magnitudes induced in the sense windings 42 to change. This signal condition is sensed to develop an indication of bearing wear.

During this time, however, the currents flowing in the motor stator winding 52 cause electromagnetic fields to be developed in the vicinity of the sense windings 42. These electromagnetic fields can be sufficient to induce noise in the sense winding signals that prevents detection of movement of the rotor structure 16.

Figure 3:
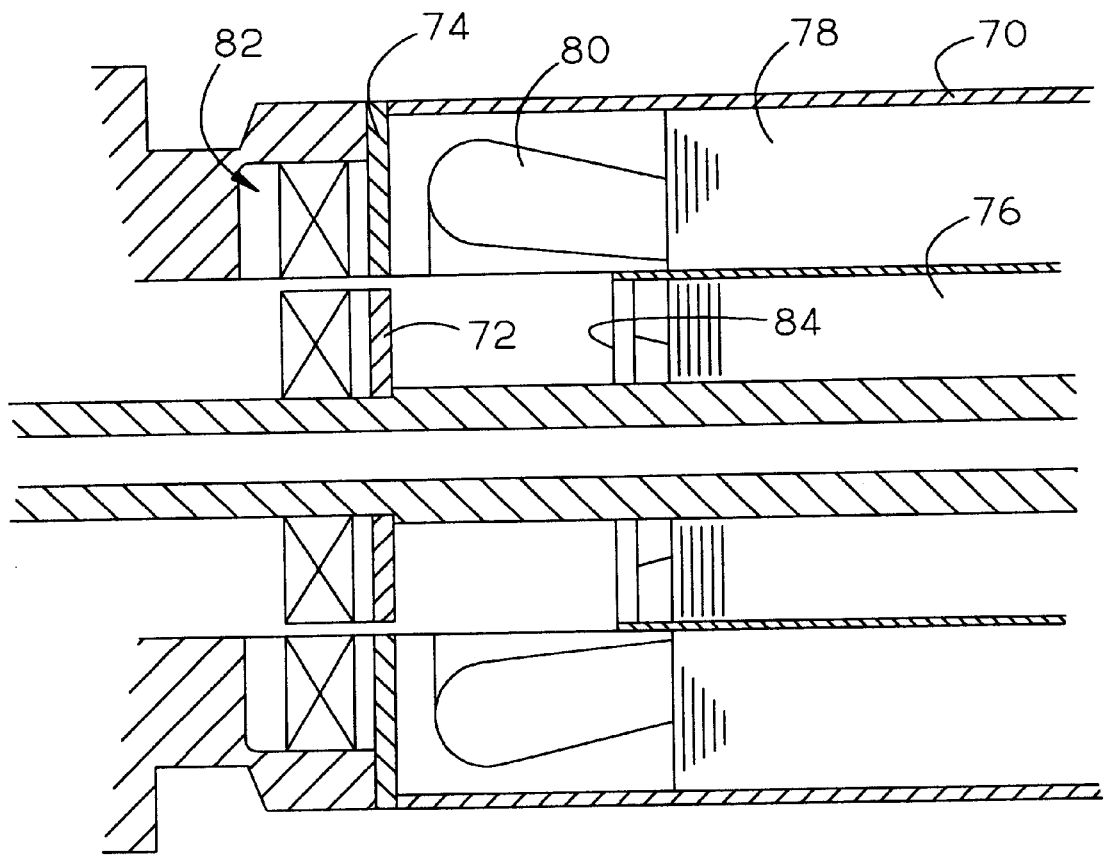

In an attempt to overcome this problem, the prior art canned motor/pump 70 of FIG. 3 incorporates first and second electromagnetic shields 72, 74 disposed in the rotor and the stator 76, 78, respectively. The electromagnetic shields 72, 74 are fabricated of a high magnetic permeability material and are located at an axial plane between the outer extent of a set of motor stator windings 80 and a sensor assembly 82 identical to the sensor assembly 40 of FIG. 2 (it should be noted that the sense windings and the target and central core of the sensor assembly 82 are shown diagrammatically in FIG. 3). The rotor shield 72 is spaced a significant distance away from an end turn shorting ring 84. As can be seen by a comparison of FIG. 3 with FIG. 2, the axial length of the overall machine must be increased to allow the sensor assembly 82 and the shields 72 and 74 to be placed outside of the outermost radial extent of the motor stator winding 80 so that sufficient immunity from electromagnetic interference is obtained.

Figure 4:
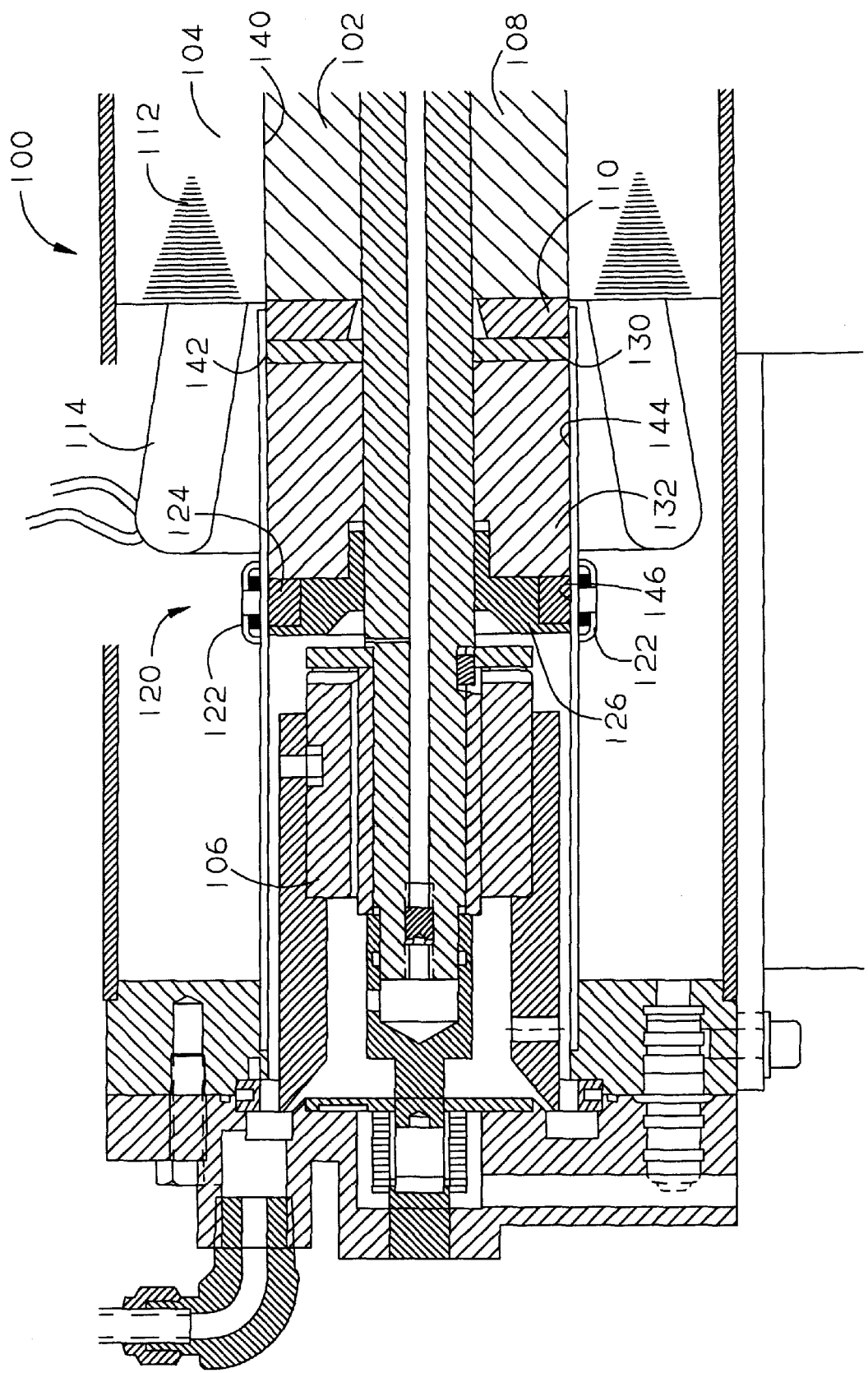

FIG. 4 illustrates a canned motor/pump 100 incorporating the present invention. The canned motor/pump 100 includes a rotor 102, a stator 104 and a bearing 106 which mounts the rotor 102 for rotation within the stator 104. The rotor 102 includes a rotor structure 108 comprising a plurality of stacked laminations. An electrically conductive shorting end ring 110 is located at an axial end of the rotor 102. A series of stacked stator laminations 112 are located in the stator 104 and one or more sets of motor stator windings 114 extend through the laminations 112.

A sensor assembly 120 includes a stator portion comprising a plurality of sense windings 122 disposed in a common axial plane with a rotor portion comprising a sensor target 124. The target 124 is mounted for rotation on the rotor 102 by a central core 126.

A disk-shaped electromagnetic shield 130 fabricated of high magnetic permeability material, such as an iron-based material, nickel, or the like, is located adjacent to the end ring 110. If desired, a thin electrically insulating disk (not shown) may or may not be disposed between the end ring 110 and the shield 130. A spacer member 132, which may be fabricated of any suitable low magnetic permeability material, for example, aluminum, plastic, etc. . . . may be disposed between the electromagnetic shield 130 and the target 124. Alternatively, an air gap may be disposed between the shield 130 and the target 124. In either event, as can be seen in the embodiment of FIG. 4, the target 124 is spaced away from the shorting end ring 110 and the electromagnetic shield 130 a significant distance. Preferably, this distance is sufficient to result in positioning of the sensor assembly 120 at an axial plane outside the axial extent of the motor stator windings 114.

Preferably, the rotor structure 102 has a cylindrical outer surface 140 which substantially matches a cylindrical outer surface 142 of the electromagnetic shield 130. Also preferably, the outer surface 140 substantially matches (i.e., is of the same shape and diameter) as a radially outer surface 144 of the spacer 132 and a radially outer surface 146 of the target 124.

As can be seen by an inspection of FIG. 4, the stator 104 is characterized by the absence of an electromagnetic shield therein. This fact notwithstanding, the shield 130 is effective to prevent undesired interference with the operation of the sensor assembly 120 owing to electromagnetic fields developed by the motor stator windings 114. While not completely understood, it is believed that this desirable result is obtained through a combination of blocking of the electromagnetic interference and the shunting of electromagnetic interference through the shield 130 away from the sensor assembly 120.

As can be seen from a comparison of FIG. 4 with FIG. 3, a more compact design can be obtained utilizing the present invention owing to the reduced axial length. Therefore, less physical space is required for the customer's installation. Further, less material is utilized in manufacturing and the rotor is less likely to experience vibration from shaft dynamics.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A motor, comprising:
    a stator;
    a rotor having a rotor structure including magnetically permeable material and terminating at a first axial plane;
    a sensor assembly disposed at a second axial plane spaced from the first axial plane; and
    an electromagnetic shield carried by the rotor and located between the first and second axial planes;
        wherein the stator is characterized by the absence of an electromagnetic shield therein.

2. The motor of claim 1, further including a spacer element carried by the rotor between the electromagnetic shield and the sensor assembly.

3. The motor of claim 2, wherein the spacer element is fabricated of a low permeability material.

4. The motor of claim 1, wherein the sensor assembly includes stator and rotor portions in the second axial plane and wherein the rotor structure includes a shorting end ring in the first axial plane.

5. The motor of claim 4, wherein the electromagnetic shield is in proximity to the shorting end ring and further including a spacer element of low magnetic permeability disposed between the electromagnetic shield and the rotor portion of the sensor assembly.

6. The motor of claim 1, wherein the stator includes motor stator windings therein terminating at a third axial plane spaced from the second axial plane.

7. The motor of claim 6, wherein the third axial plane is spaced from the first axial plane.

8. The motor of claim 1, wherein the electromagnetic shield comprises a disk shaped piece of electrically conductive material.

9. The motor of claim 8, wherein the rotor structure has a cylindrical outer diameter matching a cylindrical outer surface of the electromagnetic shield.

10. In a canned motor/pump including a stator having a stator winding, a rotor carrying a rotor structure and a sensor assembly spaced from the rotor structure, the improvement comprising:

means carried by the rotor in abutment with the rotor structure and not disposed in the stator for electromagnetically shielding the sensor assembly from the stator winding.

11. The improvement of claim 10, further including a spacer element carried by the rotor between the electromagnetic shielding means and the sensor assembly.

12. The improvement of claim 11, wherein the spacer element is fabricated of a low permeability material.

13. The improvement of claim 10, wherein the rotor structure includes a shorting end ring terminating at a first axial plane and the sensor assembly includes stator and rotor portions in a second axial plane spaced from the first axial plane.

14. The improvement of claim 13, wherein the electromagnetic shielding means is in proximity to the shorting end ring and further including a spacer element of low magnetic permeability material disposed between the electromagnetic shielding means and the rotor portion of the sensor assembly.

15. The improvement of claim 14, wherein the stator winding terminates at a third axial plane spaced from the second axial plane.

16. The improvement of claim 15, wherein the third axial plane is spaced from the first axial plane.

17. The improvement of claim 15, wherein the electromagnetic shielding means comprises a disk-shaped piece of electrically conductive material.

18. The improvement of claim 17, wherein the rotor structure has a cylindrical outer diameter matching a cylindrical outer surface of the electromagnetic shielding means.

* * * * *